(12) United States Patent
Chiang

(10) Patent No.: US 7,434,291 B2
(45) Date of Patent: Oct. 14, 2008

(54) CONNECTOR FOR WINDSCREEN WIPER

(75) Inventor: Min-Heng Chiang, Taipei Hsien (TW)

(73) Assignee: Fu Gang Co., Ltd., Taipei Hsien (TW)

( * ) Notice: Subject to any disclaimer, the term of this patent is extended or adjusted under 35 U.S.C. 154(b) by 0 days.

(21) Appl. No.: 11/686,359

(22) Filed: Mar. 15, 2007

(65) Prior Publication Data

US 2008/0222830 A1    Sep. 18, 2008

(51) Int. Cl.
*B60S 1/40*    (2006.01)
(52) U.S. Cl. .............. 15/250.32; 15/250.43; 15/250.351
(58) Field of Classification Search .............. 15/250.32, 15/250.31, 250.351, 250.43, 250.44
See application file for complete search history.

(56) References Cited

U.S. PATENT DOCUMENTS 7,299,520 B2 * 11/2007 Huang ..................... 15/250.32
2006/0117515 A1 * 6/2006 Fink et al. ................ 15/250.32

FOREIGN PATENT DOCUMENTS

EP    1795406    *    6/2007

* cited by examiner

*Primary Examiner*—Gary K Graham
(74) *Attorney, Agent, or Firm*—Leong C. Lei

(57) ABSTRACT

A connector for windscreen wiper is disclosed. The connector comprises a seat body having two lateral sides extended outwardly to form a mounting section having a front end provided with an engaging section, and the rear end of the seat body having a T-shaped elongated rod, wherein the two lateral sides of the elongated rod are respectively mounted with a vertical engaging hook and the inner edge of the seat body is provided with symmetrical semi-circular fastening plate; and (b) a hood body which is conic shape provided with a fastening hole corresponding to the seat body engaging hook; thereby a windscreen connector is formed such that a securing device of a soft-frame windscreen wiper can be secured at the fastening plate and in installation, the wiper arm is inserted into the mounting section such that the engaging hook is engaging at the engaging section at the front end of the mounting section, and the hook body is secured to the fastening hole using the engaging hook.

4 Claims, 7 Drawing Sheets

CONNECTOR FOR WINDSCREEN WIPER

BACKGROUND OF THE INVENTION (a) Technical Field of the Invention

The present invention relates to a windscreen wiper connector, and in particular, a connector which can be mounted to different types of wiper arm.

(b) Description of the Prior Art

Conventionally, when installation of the soft-frame wiper, the body of the wiper is locked with a securing member at the center position, and a securing member is secured to a connector, which is connected to the wiper arm of the vehicle. Due to the large curvature of the wiper motion, the firm securing of the connector is important. As a result, convention connector is made very complicated which thus make the installation process a difficulty to most of the people. Accordingly, it is an object of the present invention to provide a connector for windscreen wiper which mitigates the above drawback.

SUMMARY OF THE INVENTION

The primary purpose of the present invention is to provide a connector for windscreen wiper comprising a seat body having two lateral sides extended outwardly to form a mounting section having a front end provided with an engaging section, and the rear end of the seat body having a T-shaped elongated rod, wherein the two lateral sides of the elongated rod are respectively mounted with a vertical engaging hook and the inner edge of the seat body is provided with symmetrical semi-circular fastening plate; and a hood body which is conic shape provided with a fastening hole corresponding to the seat body engaging hook; thereby a windscreen connector is formed such that a securing device of a soft-frame windscreen wiper can be secured at the fastening plate and in installation, the wiper are is inserted into the mounting section such that the engaging hook is engaging at the engaging section at the front end of the mounting section, and the hooked body is secured to the fastening hole using the engaging hook.

Yet still another object of the present invention is to provide a connector for windscreen wiper, wherein the bottom edge of the engaging section is inwardly converged, facilitating the securing of the wiper arm and installation.

A further object of the present invention is to provide a connector for windscreen wiper, wherein the upper edge of the front end of the seat body is an opening having a fastening plate at the internal edge thereof for engagement with different type of wiper arm.

Still yet another object of the present invention is to provide a connector for windscreen wiper, wherein the center position of the bottom edge of the hood body and the seat body are respectively provided with inverted triangular shaped opening such that the opening provides a space when the wiper is triggered to move.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
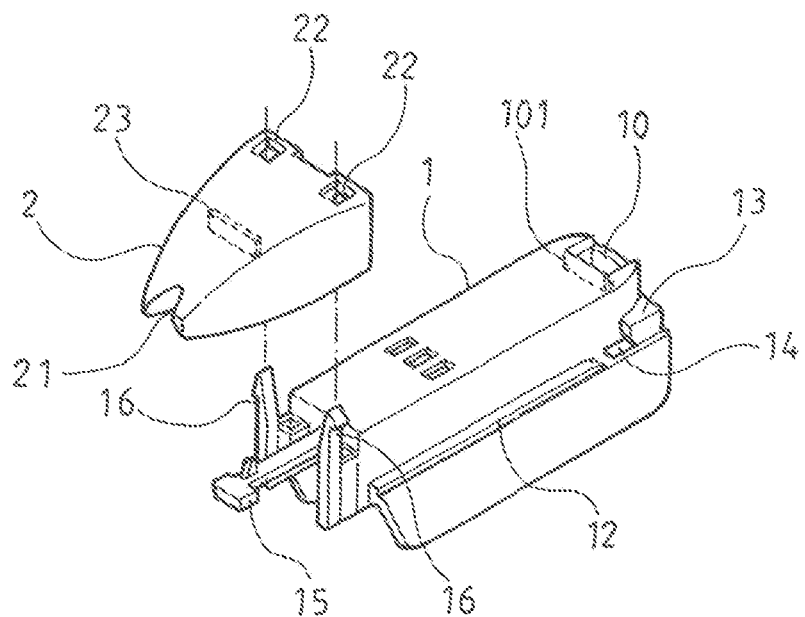
FIGS. 1 and 2 show a perspective view of a connector windscreen wiper of the present invention.
Figure 2:
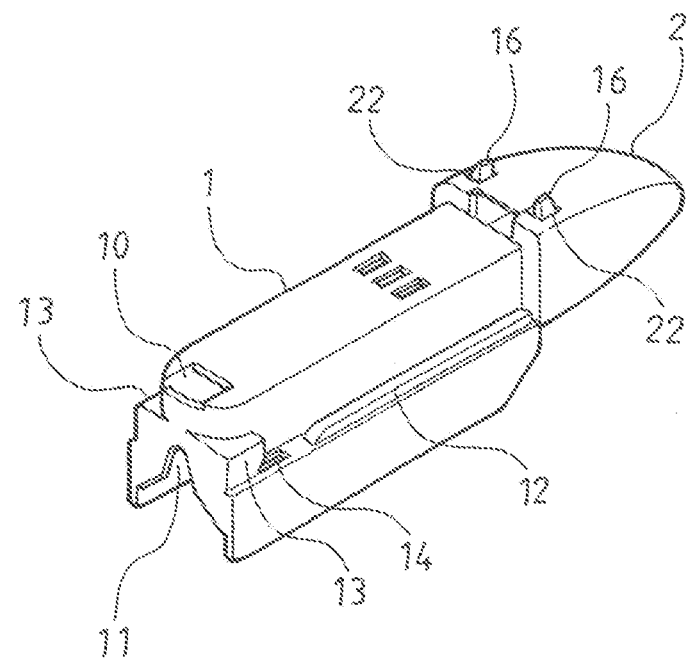
Figure 3:
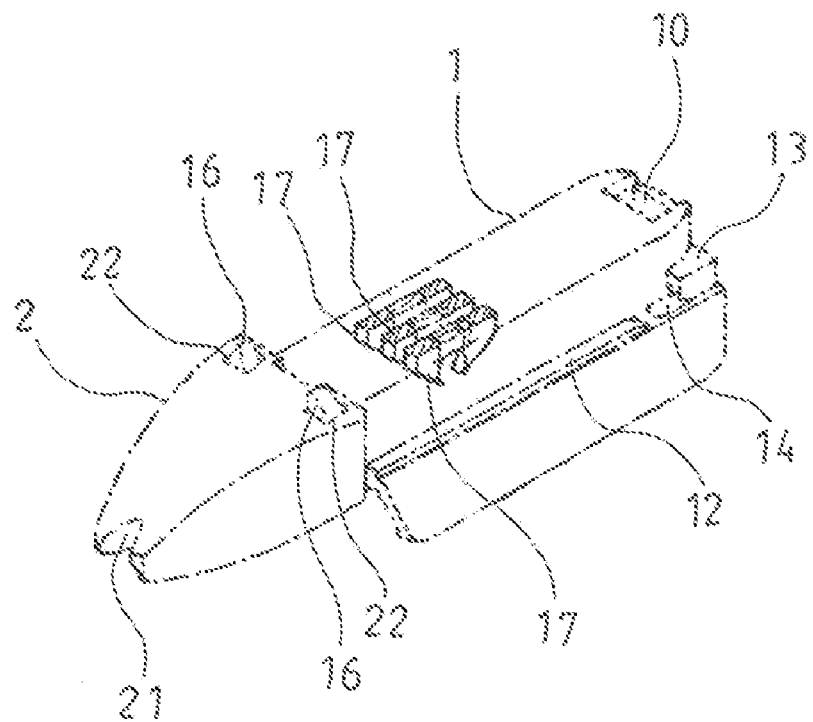
FIG. 3 is a schematic view of the fastening plate of the present invention.

Referring to FIGS. 1, 2 and 3, there is shown a connector for windscreen wiper comprising a seat body 1 and a hood body 2. The top edge of the front end of the seat body 1 is provided with a substantially recessed communication opening 10, and the inner edge of the communication opening 10 is provided with a hooking plate 101. The bottom edge of the front end is an inverted triangular shape opening 11 and the two lateral sides of the seat body 1 is provided with an outwardly extended mounting section 12. The front end of the mounting section 12 is an engaging section 13 which is a bit raised, and the bottom edge of the engaging section 13 is inwardly converged, and the front edge of the engaging section 13 has a fastening hole 14. The rear section of the seat body is a T-shaped elongated rod 15. The two lateral sides of the elongated rod 15 are respectively provided with a vertical engaging hook 16. The center of the inner edge of the seat body 1 is a symmetrical semi-circular engaging plate 17.

The hood body 2 is a sharp arched shape, and the bottom edge of the front end of the hood body 2 has an inverted triangular shape opening 21. The top edge of the hood body 2 has fastening hole 22 corresponding to the engaging hook 16 of the seat body 1. The inner edge of the hood body 2 is provided with a blocking plate 23.

By combination of the above components, a windscreen wiper connector in accordance with the present invention is formed, such that the securing device of the soft-frame wiper can be mounted into the engaging plate 17 of the seat body 1. In combination, the wiper arm is inserted into the mounting section 12 such that the fastening hook of the wiper arm is positioned at the engaging section 13 and the fastening hole 14 at the front end of the mounting section 12. After that the engaging hook 16 passes through the fastening opening 22 of the hook body 2, thus, the installation of the wiper connector is achieved conveniently.

Figure 4:
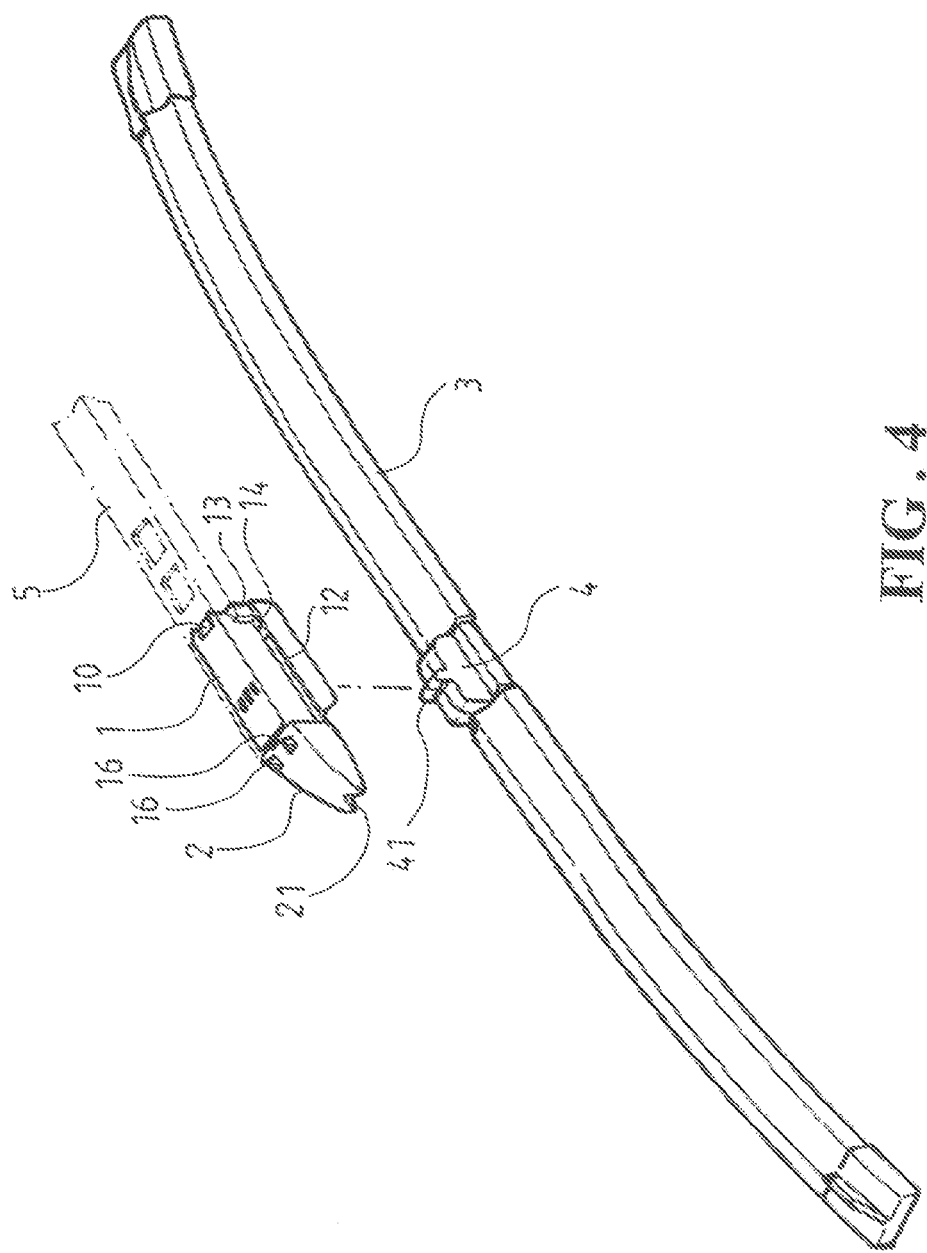
FIG. 4 is a schematic view showing the mounting of the connector onto the soft-frame wiper in accordance with the present invention.
Figure 5:
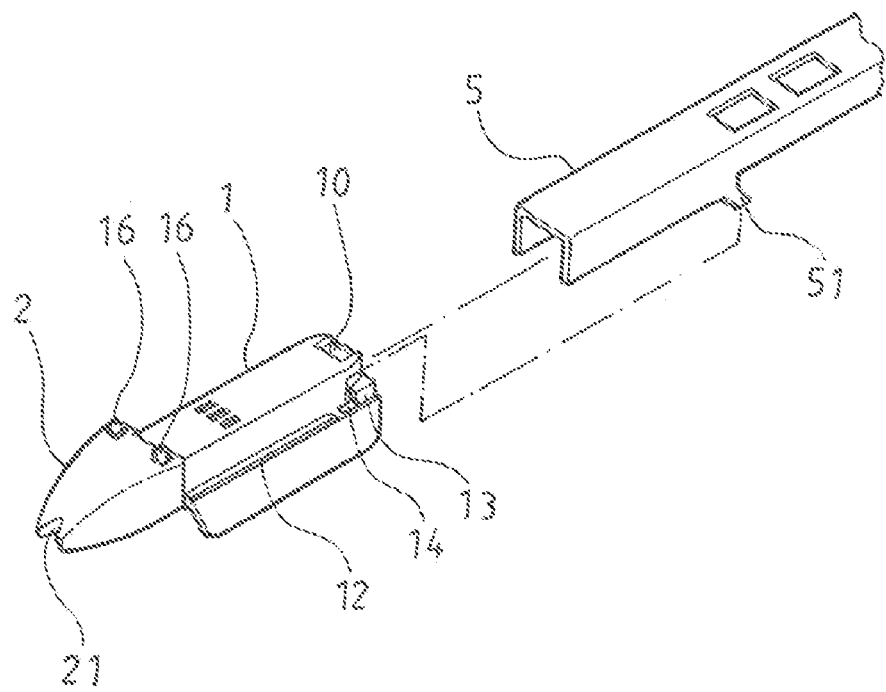
FIG. 5 is a schematic view showing the mounting of the connector onto the wiper arm in accordance with the present invention.
Figure 6:
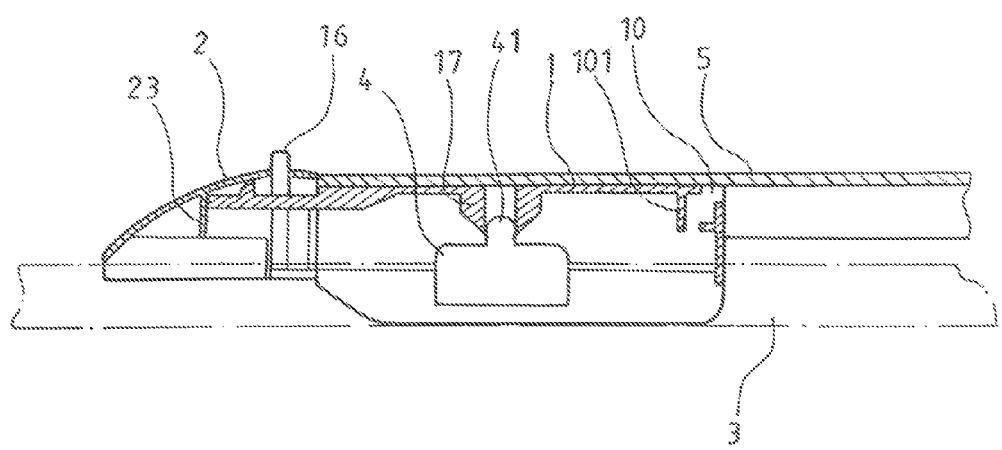
FIG. 6 is a sectional view of the connector after installation in accordance with the present invention.

As shown in FIGS. 4, 5 and 6, there is shown the installation of the connector in accordance with the present invention.

The securing device 4 of the soft-frame wiper 3 is mounted with the engaging plate 17 of the seat body via the engaging section 41. The wiper arm 5 is then mounted via the mounting section of the seat body 1, such that the fastening hook 51 at the bottom edge of the mounting section 12 is hooked at the engaging section 13 at the front end of the mounting section 12 such that the fastening hook 51 is positioned at the fastening hole 14 so that the wiper arm 5 and the seat body are connected. The engaging hook 16 at the rear section of the seat body 1 passes the fastening hole 22 of the hood body 2 such that the T-shaped elongated rod 15 urges the blocking plate 23 of the hood body 2, thus a complete windscreen wiper is formed. In view of the above, the installation of the connector, the soft-frame wiper 3 and the wiper arm 54 is convenient.

Figure 7:
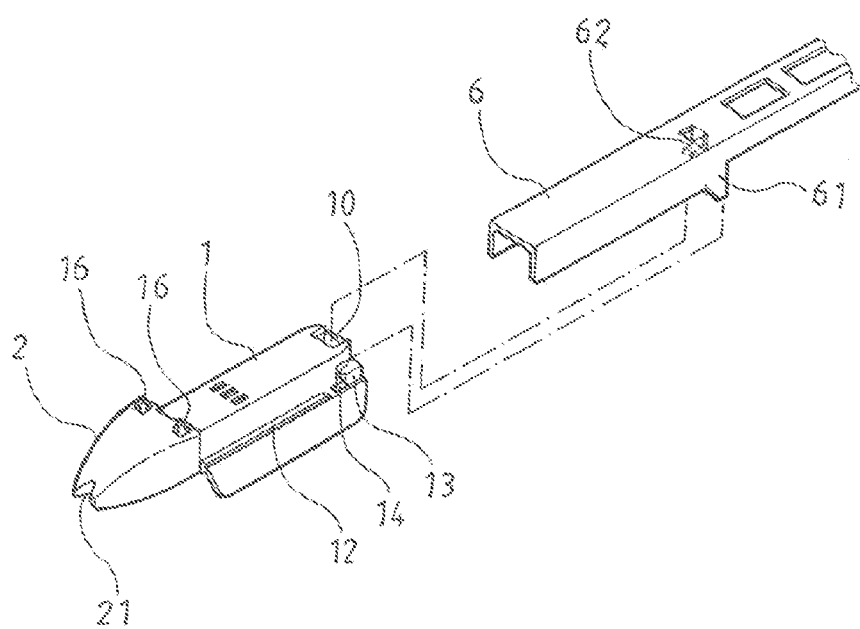
FIG. 7 is a perspective view of another preferred embodiment of the present invention.
Figure 8:
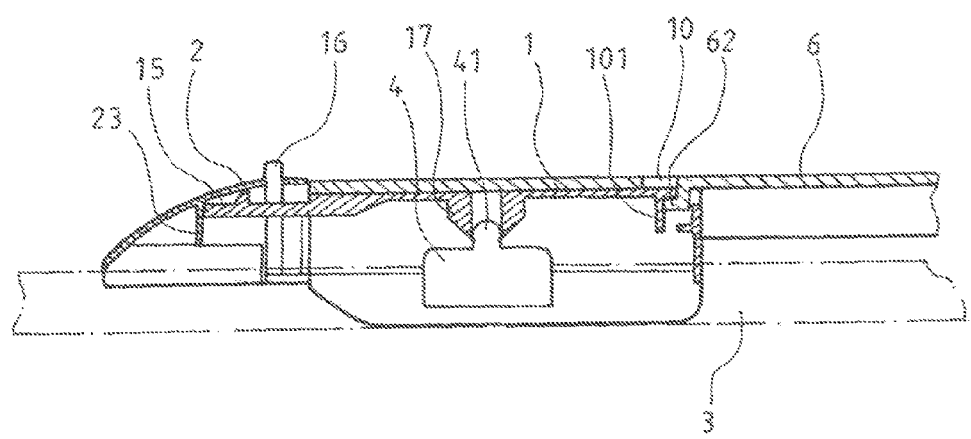
FIG. 8 is a sectional view of another preferred embodiment of the present invention.

Referring to FIGS. 7 and 8, the connector of the present invention can be employed on different type of wiper arm. As shown in the figures, the securing device 4 is mounted to the engaging plate 1 of the seat body 1 with the engaging section thereof. The wiper arm 6 of different form is mounted to the mounting section 12 of the seat body 1 such that the fastening hook 61 of the bottom edge of the mounting section 12 is positioned at the engaging section 13 at the front end of the mounting section 12 such that the fastening hook 61 is positioned at the fastening hole 14. The fastening hook 61 is flat, thus, the inner edge of the wiper arm 6 is provided at an appropriate position an engaging hook 62. The engaging hook 62 passes through the communication hole or opening 10 at the upper edge at the front end of the seat body and is hooked at the fastening plate 101 at the inner edge of the communication hole 10 such that the wiper arm 6 and the seat body 1 is connected. The engaging hook 16 at the rear section of the seat body 1 passes through the fastening hole 22 of the hood body 2 such that the T-shaped elongated rod 15 urges the blocking plate 23 of the hook body 2 so that a complete wiper structure is obtained. Thus, the connector of the present invention could be employed on different form or type of wiper arm.

When the soft-frame wiper 3 rotates or swings, due to the fact that the center position of the bottom edge of the seat body 1 and the hook body 2 are provided with the inverted triangular shaped openings 11, 21, the openings 11, 21 are used as a space for the movement of the wiper such that the swinging of the wiper 3 is smooth.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A connector for windscreen wiper comprising
   (a) a seat body having two lateral sides extended outwardly to form a mounting section having a front end provided with an engaging section, and a rear end of the seat body having a T-shaped elongated rod, wherein two lateral sides of the elongated rod are respectively mounted with a vertical engaging hook and an inner edge of the seat body is provided with a pair of symmetrical semi-circular engaging plates; and (b) a hood body provided with a fastening hole corresponding to each vertical engaging hook;
   thereby a windscreen connector is formed such that a securing device of a soft-frame windscreen wiper can be secured at the engaging plates and in installation, the wiper arm is inserted into the mounting section such that a fastening hook thereof is engaging at the engaging section at the front end of the mounting section, and the hood body is secured by engaging the vertical engaging hooks with the fastening holes.

2. The connector for windscreen wiper of claim 1, wherein a bottom edge of the engaging section is inwardly converged, facilitating the securing of the wiper arm and installation.

3. The connector for windscreen wiper of claim 1, wherein an upper edge of a front end of the seat body has an opening having a fastening plate at an internal edge thereof for engagement with different type of wiper arm.

4. The connector for windscreen wiper of claim 1, wherein a center position of a bottom edge of the hood body and the seat body are respectively provided with an inverted triangular shaped opening such that the opening provides a space when the wiper is triggered to move.

\* \* \* \* \*